July 18, 1950  V. M. GILSTRAP  2,515,445

GLASS CUTTING MACHINE

Filed May 7, 1947   2 Sheets-Sheet 1

Inventor:
Vernon M. Gilstrap,
By Brown, Jackson, Boettcher &
Dienner Attys.

July 18, 1950 V. M. GILSTRAP 2,515,445
GLASS CUTTING MACHINE
Filed May 7, 1947 2 Sheets-Sheet 2

Inventor:
Vernon M. Gilstrap,
By Brown, Jackson, Boettcher &
Dienner Att'ys.

Patented July 18, 1950

2,515,445

UNITED STATES PATENT OFFICE 2,515,445

GLASS CUTTING MACHINE

Vernon M. Gilstrap, Chicago, Ill., assignor to Dearborn Glass Company, Chicago, Ill., a corporation of Illinois Application May 7, 1947, Serial No. 746,446

7 Claims. (Cl. 49—48)

My invention relates to new and useful improvements in power driven glass cutting machines for cutting glass discs from a sheet of glass.

The power driven glass cutter of the present invention is capable of rapidly cutting glass discs ranging from relatively small diameters up to diameters of several inches.

An important object of my invention is the provision of a power driven glass cutter which operates automatically to cut glass discs of first quality from a sheet or plate of glass, at a rapid rate.

A specific object of the invention is the provision of a power driven glass cutting machine for cutting glass discs from a sheet of glass wherein the rotating spindle is spring loaded so as to force a glass cutting tool carried by the spindle onto a glass plate with a predetermined pressure, and wherein a cam is operatively interconnected with the spindle, so as to raise the cutting tool at the end of each complete revolution thereof.

An important object of the invention is the provision of an attachment for the lower end of the rotating spindle of a glass cutting machine, which attachment carries both a rigidly held cutting tool and a spring biased roller adapted to bear down on a glass plate with a predetermined force when the cutting tool engages the plate.

Still another important object of the invention is the provision of a glass cutting machine having a rotating spindle which carries a glass cutting tool on the lower end thereof, and wherein the spindle is biased downwardly with a predetermined force, so as to force the cutting tool into engagement with a plate of glass in the machine, and wherein there is also provided a glass engaging roller positioned outside of and to the rear of the cutting tool and independently biased downwardly onto the glass plate which is being cut by the cutting tool.

Other objects of the invention will, in part, be obvious, and will, in part, appear hereinafter.

For a more complete understanding of the nature and scope of my invention, reference may now be had to the following detailed description of the presently preferred embodiment thereof, taken in connection with the accompanying drawings, wherein.

Figure 1:
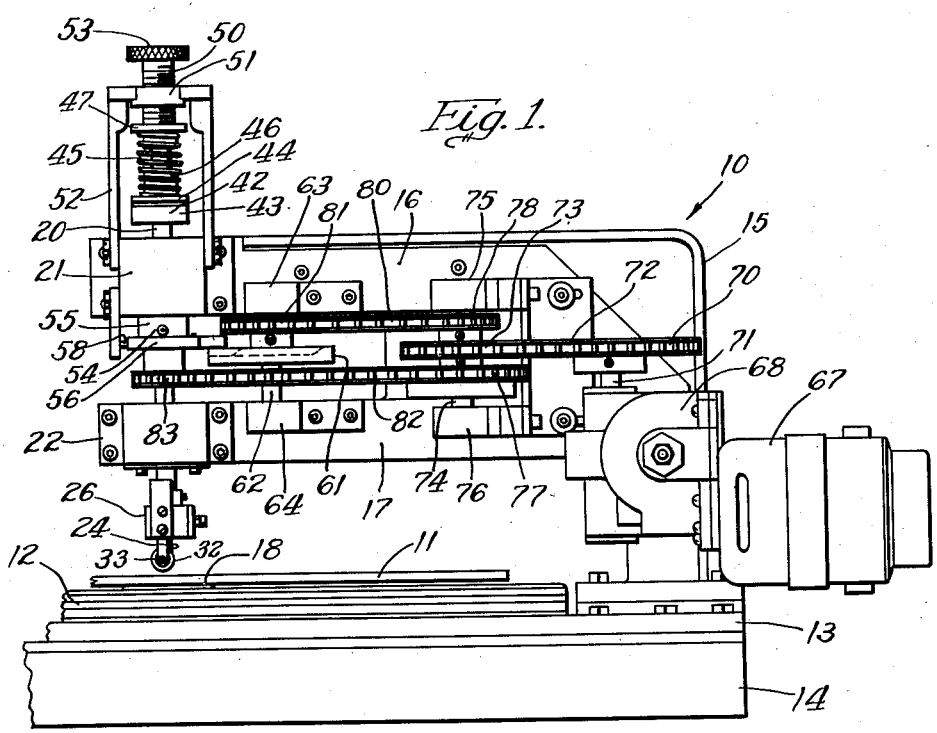
Figure 1 is a side elevational view of a power driven glass cutter embodying my present invention and with the cutting tool in the raised position.

The reference character 10 indicates generally a power driven glass cutting machine for cutting glass discs from a plate of glass 11 supported on the flat table top 12. The base 13 of the glass cutter 10 is supported on two angle irons 14. A cantilever arm 15 is supported from one side of the base 13 and provides an upper arm section 16 and a lower arm section 17, both of which project over the table top 12.

In order to assist in the opening of the scoring as each glass disc is cut, as will appear more fully hereinafter, a mound or disc 18 of somewhat smaller diameter than the glass discs being cut, is disposed on the top of the table 12 underneath the glass plate 11.

The rotating spindle 20 of the glass cutter 10 is journaled in bearings 21 and 22 carried by the upper and lower cantilever arm sections 16 and 17, respectively. The details of construction of the bearings 21 and 22 are not important, the primary requirement for them being that they permit the spindle 20 to rotate freely, and at the same time be free to move up and down a short distance, so as to permit the cutting tool 23 mounted on the lower end of the spindle to be raised from and lowered onto the glass plate 11.

Figure 4:
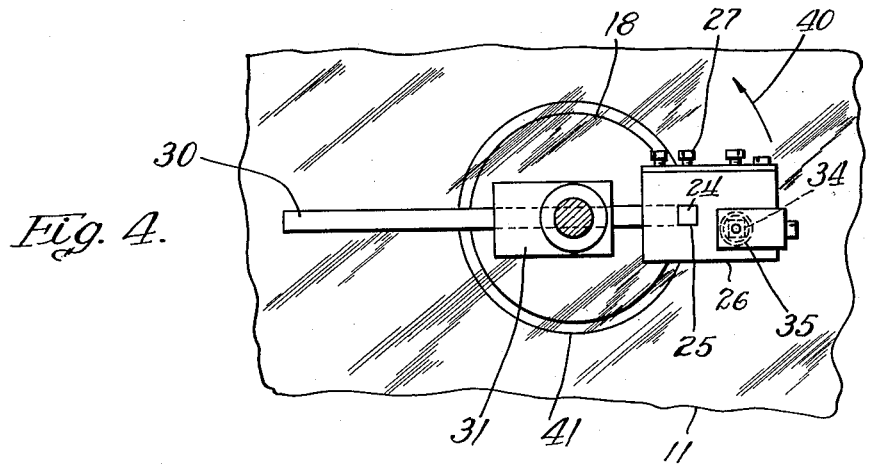
Figure 4 is an enlarged, fragmentary, sectional view taken on the line 4—4 of Figure 3.

The glass cutting tool 23 is shown as a conventional glass cutting disc, but it will be understood that it may be replaced with a diamond cutting tool, if desired. The cutting tool 23 is carried on the lower end of a square shank 24 which extends up through a square opening 25 (Figure 4) in an attachment 26. A set screw 27 permits the shank 24 to be fixed in any desired position of elevation in the attachment 26.

The attachment 26 is carried on one end of a square bar 30 which passes through a fixture 31 therefor secured to the lower end of the spindle 20. The bar 30 may be slidably adjusted in the fixture 31, as desired, depending upon the diameter of the glass discs which are to be cut.

Figure 3:
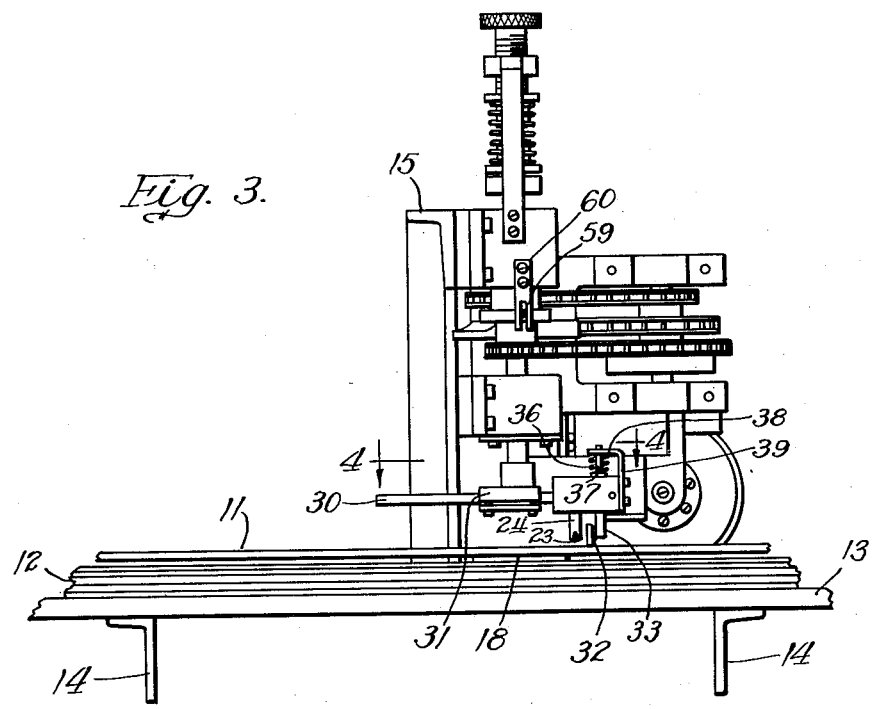
Figure 3 is a left end elevational view of the glass cutter as shown in Figure 1.

The attachment 26 also supports a glass engaging roller 32 (Figure 3) supported on the lower end of a shank 33. The shank 33 is square in cross-section and extends through a square opening provided for in the attachment 26, so as to be slidable up and down therein without turning. This opening is indicated at 34 in Figure 4. The upper end of the opening 34 is counter-bored, as indicated at 35 in Figure 4, so as to permit movement therein of the lower end of a compression spring 36 (Figure 3) which fits around the small diameter extension 37 of the shank 33. The top of the compression spring 36 is retained by the horizontal portion 38 of a bracket 39 which is secured to the outer side of the attachment 26.

The spring 36 serves normally to bias the roller 32 downwardly to a position beneath the glass cutting tool 23. Accordingly, when the glass cutting tool 23 engages and is cutting the glass plate 11, the roller 32 will be caused to bear down on the glass plate with a predetermined force, depending upon the strength of the spring 36. As will be seen from Figure 4, the roller 32 is positioned outside of and slightly to the rear of the cutting tool 23 when the spindle 20 rotates in the direction indicated by the arrow 40. The glass cutting tool 23 serves to score the plate 11, as indicated by the circular line at 41 (Figure 4), and the roller 32 serves to open up the score mark, this being permitted by reason of the glass plate being somewhat lifted from the table top 12 by the thin disc 18.

The spindle 20 projects above the upper arm section 16 and carries a two-part thrust bearing 42 of known type, the lower part 43 of which is fixed to the spindle 20, while the upper part 44 is free to rotate. The lower end of a compression spring 45 rests on the top of the upper bearing part 44 and fits around the sleeve portion 46 thereof. The upper end of the compression spring is retained by the flange of a flanged collar or nipple 47. The spindle 20 projects through the top of the collar 47 and is free to rotate therewithin.

In order to adjust the amount of compression on the spring 45, an adjusting screw 50 is provided which is hollow and free to fit over the upper end of the spindle 20. The screw 50 is threaded in a stationary nut 51 supported from the upper arm section 16 by means of a frame 52. By turning the knurled thumb head 53 of the adjusting screw 50, the distance between the flange of the collar 47 and that of the upper bearing part 44 may be adjusted, thereby giving the spring 45 the desired amount of compression. It will be apparent that the compression force of the spring 45 is carried by the thrust bearing 42, so as to bias the spindle 20 downwardly with a predetermined amount of force.

The spindle 20 is provided with another thrust bearing 54, also of known type, having an upper part 55 which is fixed to the spindle 20 and a lower part 56 which is free to rotate thereon. The lower part 56 of the bearing 54 carries a cam engaging roller 57 projecting laterally from one side thereof. Diametrically opposed to the roller 57, the bearing part 56 is provided with a short projection 58 which fits in the guide slot 59 (Figure 3) provided in the lower end of a piece 60 bolted to the side of the bearing 21. The projection 58 serves to prevent the bearing part 56 from rotating with the spindle 20 and maintains the cam engaging roller 57 in a single vertical plane. The slot 59 allows for the reciprocating movement of the spindle 20.

Figure 2:
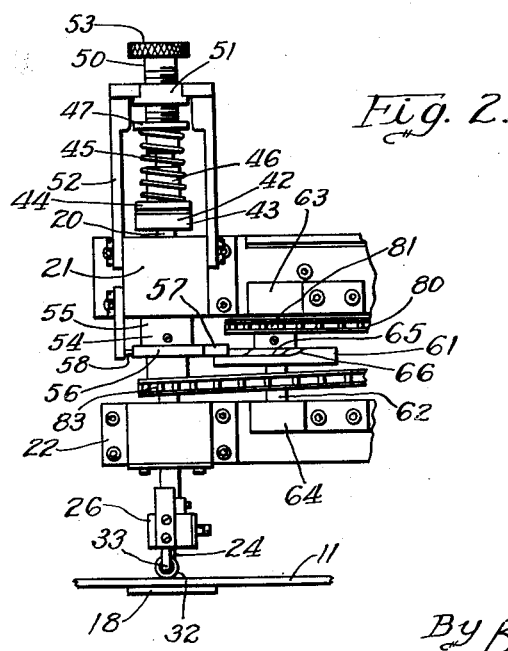
Figure 2 is a fragmentary side elevational view of the glass cutter shown in Figure 1 showing the cutting tool and associated parts, in position for the tool to engage a glass plate supported on the machine.

The cam engaging roller 57 engages the top cam surface of a disc-shaped cam 61 carried on a vertical shaft 62 journaled in the bearings 63 and 64, mounted on the arm sections 16 and 17, respectively. When the roller 57 engages a cutout portion 65 (Figure 2) of the upper surface of the cam 61, the glass cutting tool 23 is allowed to engage the glass plate 11 under the force of the compression spring 45. The cut-out portion 65 may have an angular spread of about 120° and joins the flat upper portion of the cam surface at opposite ends at the inclines 66. The inclines 66 may have an angle of approximately 45°.

The spindle 20 and the cam 61 are operatively interconnected together in driving relationship with an electric motor 67, in such manner that the cam 61 permits the spindle 20 to retain its lowered position with the cutting tool 23 engaging the glass plate 11 for a single, complete revolution, and sharply on the completion of each revolution, the cam 62 elevates the spindle 22 and the cutting tool 23, thereby permitting the glass plate 11 to be moved underneath the cutting tool 23 to a new position.

The rotor of the electric motor 67 is connected with a gear box indicated at 68, so as to rotate a sprocket 70 carried on a shaft 71 at a speed of approximately 30 R. P. M. The sprocket 70, by means of a chain 72 running thereover, drives a sprocket wheel 73 carried on a shaft 74. The shaft 74 is journaled at opposite ends in bearings 75 and 76 carried on the arm sections 16 and 17, respectively. Beneath the sprocket 73, the shaft 74 carries a sprocket 77, while above the sprocket 73, the shaft carries another sprocket 78.

The sprocket wheel 78 serves to drive the cam 62 by means of a chain 80 which runs over a sprocket wheel 81 carried on shaft 62 which supports the cam 61. The sprocket wheel 77, by means of a chain 82 running over a sprocket wheel 83 on the spindle 20 serves to drive the spindle 20 and rotate the glass cutter 23.

The diameters of the sprocket wheels are so selected that the spindle 20 rotates at approximately 90 R. P. M., while the cam 61 rotates at approximately 30 R. P. M. It will, of course, be understood that other speeds, and ratios of speeds, may be used. However, the driving arrangement should be such as to lift the spindle 20 sharply on the completion of each 360° revolution, so that the scoring by the cutting tool 23 does not overlap at the ends.

Satisfactory operation of the glass cutting machine 10 has been obtained when the compression spring 45 exerts a downward force of 7 to 8 pounds, with the spring 36 for the glass engaging roller 32 exerting a downward force of approximately 5 pounds.

It will be obvious that certain changes and modifications may be made in the foregoing construction. Accordingly, it is intended that all matter described hereinabove, or shown in the accompanying drawings, shall be interpreted as illustrative and not in a limiting sense.

I claim:

1. In a power driven glass cutter for cutting glass discs from a sheet of glass and having a frame, in combination, a rotatable spindle journaled on the frame of the glass cutter for co-axial reciprocation toward and away from a sheet of glass, a glass cutting tool carried on the lower end of said spindle and rotatable therewith, spring loaded means for biasing said spindle downwardly with a predetermined force, a cam engaging roller supported at one place on length and laterally of said spindle with the latter being rotatable relative to said roller which is maintained in a single vertical plane, a cam journaled about a vertical axis on the frame of the glass cutter laterally of said spindle and having an upper cam surface followed by said cam engaging roller, and driving means operatively interconnecting said spindle and said cam with a power source whereby said cam serves to lift said spindle at the end of each complete revolution of the spindle.

2. In a power driven glass cutter for cutting glass discs from a sheet of glass and having a glass support table, a cantilever arm projecting over said support table, and a power source, in combination, a spindle journaled in a bearing carried by said cantilever arm, said spindle being rotatable about its principal axis within said bearing and reciprocal therein along its principal axis, a glass cutting tool carried on the lower end of said spindle and rotatable therewith, a first two-part thrust bearing fitting around said spindle with the lower part fixed thereto and with the upper part free to rotate with respect thereto, a compression spring fitting around said spindle and resting on said free upper part of said thrust bearing, an adjustable collar fitting around said spindle and adjustably compressing said spring between said collar and said upper part of said two part thrust bearing, a second two-part thrust bearing fitting around said spindle with the upper part fixed thereto and with the lower part free with respect to said spindle, a cam engaging roller projecting laterally of said lower part of said second two-part thrust bearing, stop means for preventing rotation of said lower part of said second two-part thrust bearing thereby retaining said roller in a single vertical plane, a disc-shaped cam journaled laterally of said spindle in a second bearing carried by said cantilever arm for rotation in a horizontal plane around its vertical axis, said roller being continuously engaged with the cam surface of said cam and said cam surface being shaped to allow said compression spring to force said glass cutting tool onto a piece of glass carried on the support table during a portion of a revolution of the cam and shaped to lift said cutting tool off from said piece of glass during the remainder of the revolution, and driving means operatively interconnecting said spindle and said cam with said power source whereby said cam serves to lift said spindle at the completion of each full revolution of the spindle.

3. In a power driven glass cutter for cutting glass discs from a sheet of glass and having a glass support table, a cantilever arm projecting over said support table and having an upper arm section and a lower arm section, and a power source, in combination, a spindle journaled in one bearing carried by said upper arm section and in another bearing carried by said lower arm section, said spindle being rotatable about its principal axis within said bearings and reciprocal therein along its principal axis, a glass cutting tool carried on the lower end of said spindle and including a spring biased glass engaging roller, a two-part thrust bearing on said spindle above said upper arm section with the lower part of the bearing fixed to the spidle and with the upper part free to rotate with respect thereto, a compression spring fitting around said spindle and resting on the upper free part of said first thrust bearing, a flanged collar fitting around said spindle and engaging the top of said spring, a hollow screw fitting around said spindle and engaging the top of said flanged collar, a nut threaded on said screw and stationarily supported on said upper arm section, turning of said screw serving to adjust the compression of said spring and the force with which said cutting tool engages a glass plate on the table of the cutter, a second two-part thrust bearing fitting around said spindle intermediate said upper and lower arm sections with the upper part fixed to the spindle and the lower part free with respect thereto, a cam engaging roller projecting from the side of the lower part of said second two-part thrust bearing, guide means allowing said lower part of said second two-part thrust bearing to move up and down with said spindle without rotating so as to maintain said cam engaging roller in a single vertical plane, a disc-shaped cam journaled in a set of bearings carried by said upper and lower arm sections of said cantilever arm for rotation in a horizontal plane around its vertical axis, said cam being so positioned with respect to said cam engaging roller that the latter continuously engages the upper cam surface of said cam, said cam surface being shaped to allow said compression spring to force said glass cutting tool onto a piece of glass carried on the support table during a portion of a revolution of the cam and shaped to lift said cutting tool off from said piece of glass during the remainder of the revolution, and driving means operatively interconnecting said spindle and said cam with said power source whereby said cam serves to lift said spindle at the completion of each full revolution of the spindle.

4. The combination called for in claim 3 wherein said driving means comprises chains and sprockets.

5. A glass cutting attachment adapted to be mounted on the lower end of the spindle of a glass cutting machine, which attachment comprises, a holder adapted to be secured to said spindle, a glass cutting tool rigidly held in said holder, a glass engaging roller held in said holder and movable up and down relative to said tool, and spring means biasing said roller downwardly to a position below said tool.

6. A glass cutting attachment adapted to be mounted on the lower end of the spindle of a glass cutting machine and comprising, a holder, a glass cutting tool carried on the lower end of a shank fitting in a vertical hole provided therefor in said holder, a set screw for fixedly positioning said shank relative to said holder, a glass engaging roller carried on the lower end of a second shank fitting in a second vertical hole provided therefor in said holder to the outside and to the rear of said first hole, said second shank having a portion which projects above said holder, a compression spring fitting around said projecting portion and resting on a shoulder provided on said second shank, and a support for the top of said compression spring whereby the same is retained in the compressed condition so as to normally bias said roller to a position beneath said tool.

7. In a glass cutting machine for cutting glass discs from a sheet of glass and having a rotatable spindle carrying a glass cutting tool, in combination, bearing means for said spindle whereby the latter may rotate freely and also move up and down freely in said bearings, spring loaded means for biasing said spindle downwardly with a predetermined force, a tool holder secured to the lower end of said spindle, a glass cutting tool rigidly held in said holder, a glass engaging roller held in said holder and movable up and down relative to said tool, and spring means biasing said roller downwardly to a position below said tool.

VERNON M. GILSTRAP.

REFERENCES CITED

The following references are of record in the file of this patent:

UNITED STATES PATENTS

| Number | Name | Date |
|---|---|---|
| 1,972,210 | Waldron | Sept. 4, 1934 |

FOREIGN PATENTS

| Number | Country | Date |
|---|---|---|
| 260,072 | Germany | May 14, 1912 |